(12) United States Patent
Freeman et al.

(10) Patent No.: US 7,681,941 B2
(45) Date of Patent: Mar. 23, 2010

(54) CAMPER TRAILER

(76) Inventors: Paul M. Freeman, 15B Murralong Road, Mount Colah, New South Wales 2079 (AU); Philip G. Fisher, 43 Hamilton Street, Kalibah, New South Wales 2290 (AU)

( * ) Notice: Subject to any disclaimer, the term of this patent is extended or adjusted under 35 U.S.C. 154(b) by 168 days.

(21) Appl. No.: 11/746,728

(22) Filed: May 10, 2007

(65) Prior Publication Data

US 2007/0262611 A1   Nov. 15, 2007

(30) Foreign Application Priority Data

May 10, 2006 (AU) ............................... 2006201946

(51) Int. Cl.
*B60P 3/335* (2006.01)
*E04H 15/06* (2006.01)

(52) U.S. Cl. ................... 296/168; 135/88.1; 135/88.13; 135/88.18; 135/152; 296/26.03; 296/26.08; 296/26.11; 296/26.12; 296/26.15; 296/156; 296/160; 296/161; 296/169; 296/172; 296/174; 296/176

(58) Field of Classification Search ................ 135/88.1, 135/88.13, 88.17, 88.18, 152; 296/26.03, 296/26.08, 26.11, 26.12, 26.15, 156, 159, 296/160, 161, 162, 163, 168, 169, 172, 174, 296/176
See application file for complete search history.

(56) References Cited

U.S. PATENT DOCUMENTS

| 997,270 | A | * | 7/1911 | Cofrode | ......................... | 4/460 |
|---|---|---|---|---|---|---|
| 1,422,498 | A | * | 7/1922 | Vint | ........................... | 296/172 |
| 1,530,048 | A | * | 3/1925 | Hill | ............................. | 296/156 |
| 1,771,911 | A | * | 7/1930 | Berneking | ................... | 296/176 |
| 2,032,697 | A | * | 3/1936 | Golden | ......................... | 280/2 |
| 2,066,078 | A | * | 12/1936 | Schmeiser | ................ | 135/88.13 |
| 2,155,876 | A | * | 4/1939 | Stout | ............................. | 52/69 |
| 2,167,557 | A | * | 7/1939 | Stout | ............................. | 52/69 |
| 2,551,207 | A | * | 5/1951 | Ensor | ......................... | 296/172 |
| 2,670,986 | A | * | 3/1954 | Presnell | ....................... | 296/173 |
| 2,701,393 | A | * | 2/1955 | Madsen et al. | ................. | 52/29 |

(Continued)

FOREIGN PATENT DOCUMENTS

AU       2004214553       1/2005

(Continued)

*Primary Examiner*—Glenn Dayoan
*Assistant Examiner*—Paul A Chenevert
(74) *Attorney, Agent, or Firm*—Connolly Bove Lodge & Hutz LLP

(57) ABSTRACT

A camper trailer or caravan (10) includes a chassis (12) adapted to be attached to, and towed behind a motor vehicle (11). A housing (21) is mounted on the chassis (12) and defines a main chamber including a peripheral wall. The chassis (12) is short in length and about the same width as the towing vehicle (11) with the wheels (19) located adjacent the rear end of the chassis (12), and the housing (21) is adapted be opened such that panels (41) folded inside the housing when in the closed configuration are adapted to form annex chambers (42, 43) when in the open configuration when the camper trailer (10) is being used for camping and the like. A sleeping chamber (23) associated with the main chamber extends outside the peripheral walls of said camper trailer when required. Preferably there is a kitchen chamber and a bedding chamber within the housing of the camper trailer.

11 Claims, 6 Drawing Sheets

U.S. PATENT DOCUMENTS

| | | | | |
|---|---|---|---|---|
| 2,912,274 | A * | 11/1959 | Falkner | 296/172 |
| 3,002,518 | A * | 10/1961 | Maxwell | 135/88.13 |
| 3,169,543 | A * | 2/1965 | McGerty | 135/152 |
| 3,271,065 | A * | 9/1966 | Scuris | 296/172 |
| 3,463,540 | A * | 8/1969 | Carr | 296/161 |
| 3,514,147 | A * | 5/1970 | Forsyth et al. | 296/174 |
| 3,534,997 | A * | 10/1970 | Mitchell, Jr. | 296/176 |
| 3,550,601 | A * | 12/1970 | Peters | 135/152 |
| 3,574,388 | A * | 4/1971 | Stone | 296/168 |
| 3,602,545 | A * | 8/1971 | Lindenbauer | 296/156 |
| 3,633,324 | A * | 1/1972 | Cuylits | 52/66 |
| 3,652,122 | A * | 3/1972 | Beauregard | 296/169 |
| 3,697,123 | A * | 10/1972 | Gygrynuk | 296/24.32 |
| 3,737,191 | A * | 6/1973 | Fackre | 296/26.15 |
| 3,751,103 | A * | 8/1973 | Robertson | 296/156 |
| 3,887,226 | A * | 6/1975 | Hart | 296/26.11 |
| 4,222,604 | A * | 9/1980 | Human | 296/165 |
| 4,457,553 | A * | 7/1984 | Larkin | 296/160 |
| 4,462,631 | A * | 7/1984 | Lange | 296/160 |
| 5,718,253 | A * | 2/1998 | McNamee | 135/88.13 |
| 5,934,728 | A * | 8/1999 | Nishi et al. | 296/26.15 |
| 6,135,525 | A * | 10/2000 | Amann | 296/26.11 |
| 6,135,539 | A * | 10/2000 | Bailey et al. | 296/169 |
| 6,345,471 | B1 * | 2/2002 | Gyllenhammar | 52/69 |
| 7,234,759 | B1 * | 6/2007 | Alohali | 296/168 |
| 2002/0149220 | A1* | 10/2002 | Wishart | 296/26.15 |
| 2005/0225116 | A1 | 10/2005 | Fisher et al. | |
| 2006/0066071 | A1 | 3/2006 | Fisher et al. | |

FOREIGN PATENT DOCUMENTS

| | | |
|---|---|---|
| AU | 2006201946 | 12/2006 |
| DE | 3344762 A1 * | 6/1985 |
| EP | 11041 A1 * | 5/1980 |
| EP | 269518 A1 * | 6/1988 |
| EP | 0 350 228 | 1/1990 |
| GB | 2068848 A * | 8/1981 |
| GB | 2069419 A * | 8/1981 |
| GB | 2191738 A * | 12/1987 |

* cited by examiner

CAMPER TRAILER

FIELD OF THE INVENTION

The present invention relates to camper trailers and caravans and, in particular, to an improved camper trailer suitable to be towed by a motor vehicle and including a forward entry as well as a foldable annex. The camper trailer is preferably short in length and the same width as the towing vehicle with the wheels towards the rear such that there is an ease of maneuverability for negotiating rough terrain and tight cornering.

BACKGROUND ART

Camping holidays using towed caravans are very popular activities and camper trailers can provide easy towable yet comfortable accommodation in remote areas inaccessible to normal road vehicles and trailers. Such camper trailer/caravans have been disclosed in earlier US Patent Application Publication Nos. 2005/0225166 A1 and 2006/00660071 A1.

Even though many camper trailers are suitable for most remote inaccessible off road areas, it has been found that maneuverability and tight cornering could be improved by providing a trailer with a departure angle where there is a short distance between the wheels and towing hitch, such that it is able to negotiate bumps and dips.

The genesis of the present invention is the desire to provide a camper trailer with dimensions suitable for crossing particularly tough terrain whilst providing comforts known in existing camper trailers.

SUMMARY OF THE INVENTION

In accordance with an aspect of the present invention there is disclosed a camper trailer or caravan including a chassis adapted to be attached to, and towed behind a motor vehicle, a housing mounted on the chassis and defining a main chamber including a peripheral wall, wherein said chassis is short in length and about the same width as the towing vehicle with the wheels located adjacent the rear end of said chassis, and said housing being adapted be opened such that panels folded inside the housing when in the closed configuration form annex chambers when in the open configuration when said camper trailer is being used for camping and the like, and a bedding chamber associated with the main chamber extends outside the peripheral walls of said camper trailer when required, and a kitchen chamber and the bedding chamber are within the housing of the camper trailer wherein the kitchen chamber is located at front of said housing and the bedding chamber is located at rear of said chamber and said kitchen chamber is accessed through an opening at the front of said trailer

BRIEF DESCRIPTION OF THE DRAWINGS

A preferred embodiment of the present invention will now be described with reference to the accompanying drawings in which.

DETAILED DESCRIPTION

Figure 1:
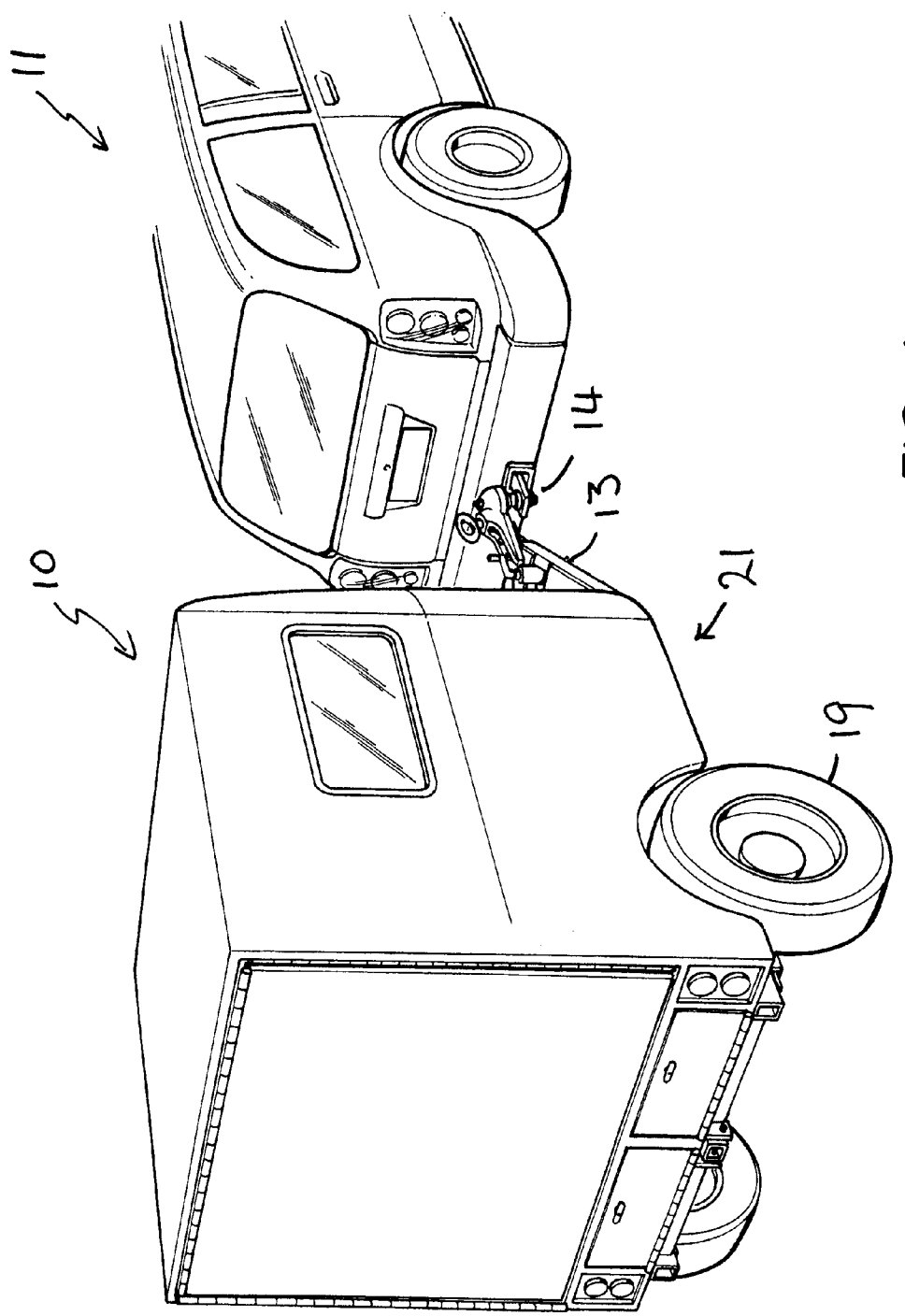
FIG. 1 is a rear perspective view of a camper trailer being towed by a motor vehicle.
Figure 2:
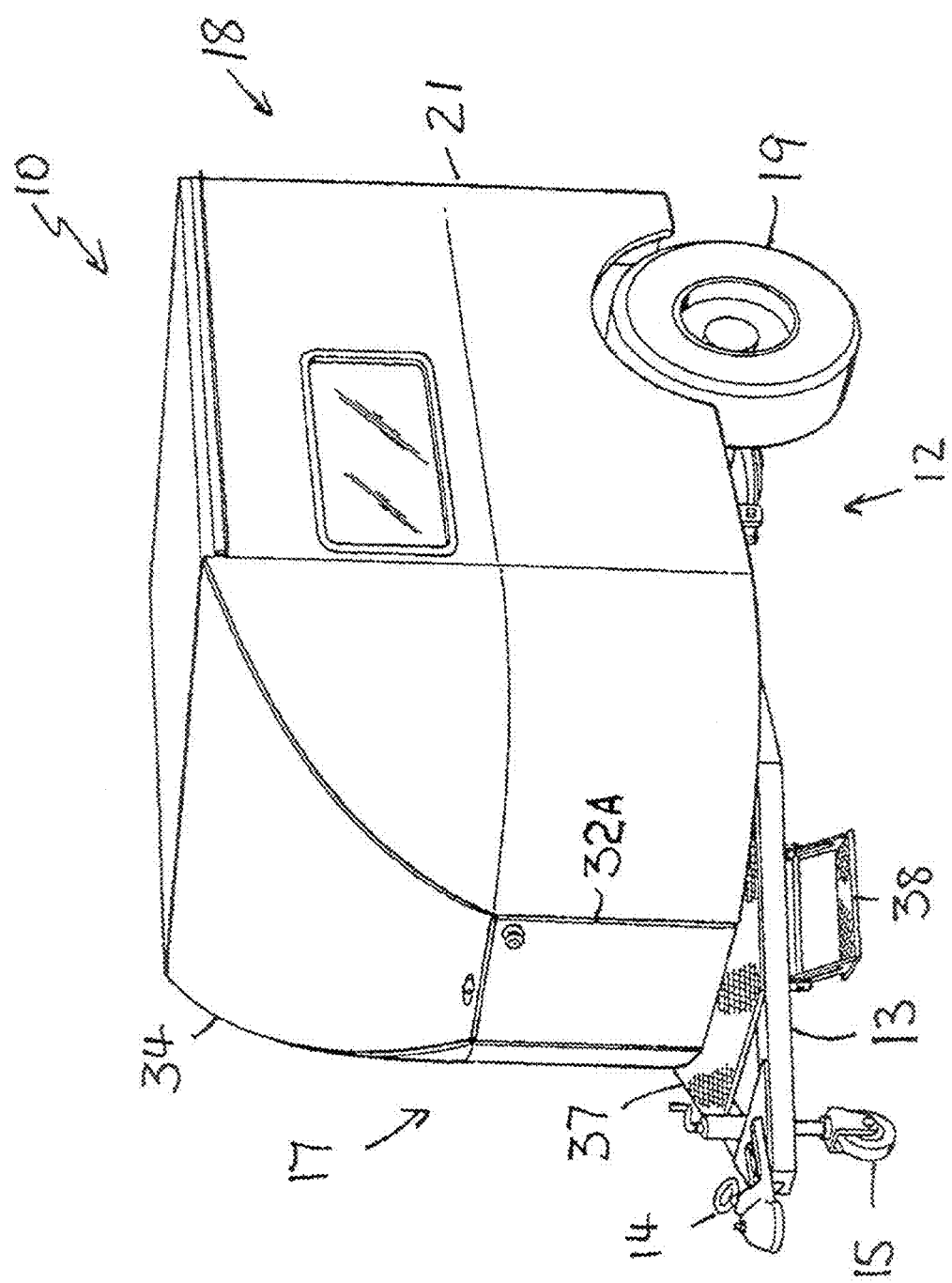
FIG. 2 is a front perspective view of the camper trailer of FIG. 1 shown in its closed configuration.

As seen in the drawings, a camper trailer 10 is adapted to be attached to and towed behind a motor vehicle 11. The camper trailer 10 has a chassis 12 which is short in length and approximately the same width as that of the towing vehicle 11.

The chassis 12 has a towing hitch frame 13 with hitch mechanism 14 which enables the camper trailer 10 to be articulatedly connected to the motor vehicle 11. Conventional jockey wheel 15 and stabilisers 16 are located at front 17 and rear 18 of the chassis 12 respectively. The chassis 12 as seen in the drawings has its wheels 19 located adjacent the rear 18 of the chassis 12.

As seen in the drawings, the camper trailer 10 includes a housing 21 mounted on the chassis 12. The housing 21 has two areas located therein, namely a kitchen chamber 22 and a bedroom chamber 23 which are within a main chamber of the housing 21.

Figure 3:
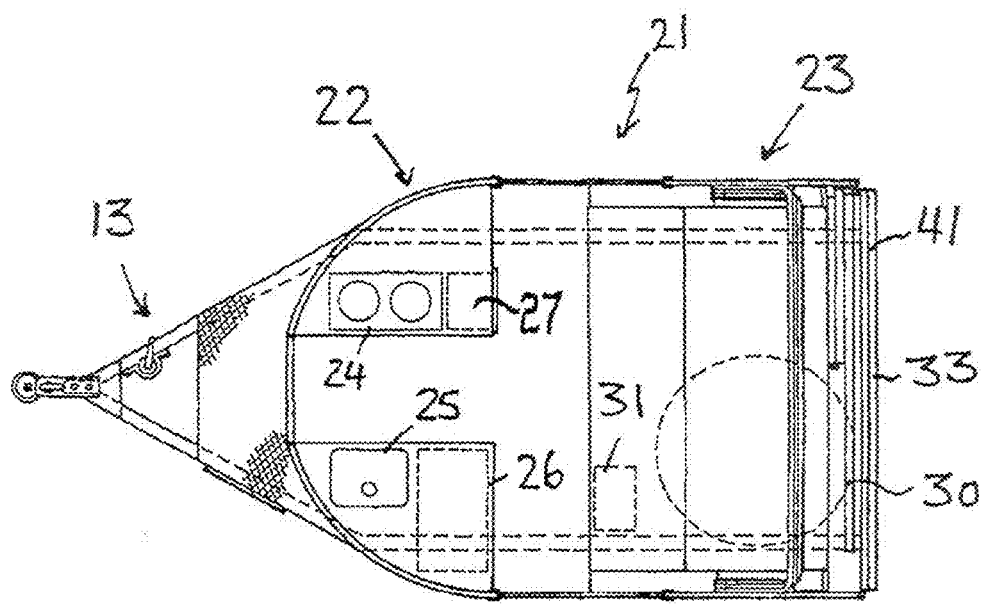
FIG. 3 is a cutaway plan view of the camper trailer of FIG. 1 in its closed configuration.
Figure 4:
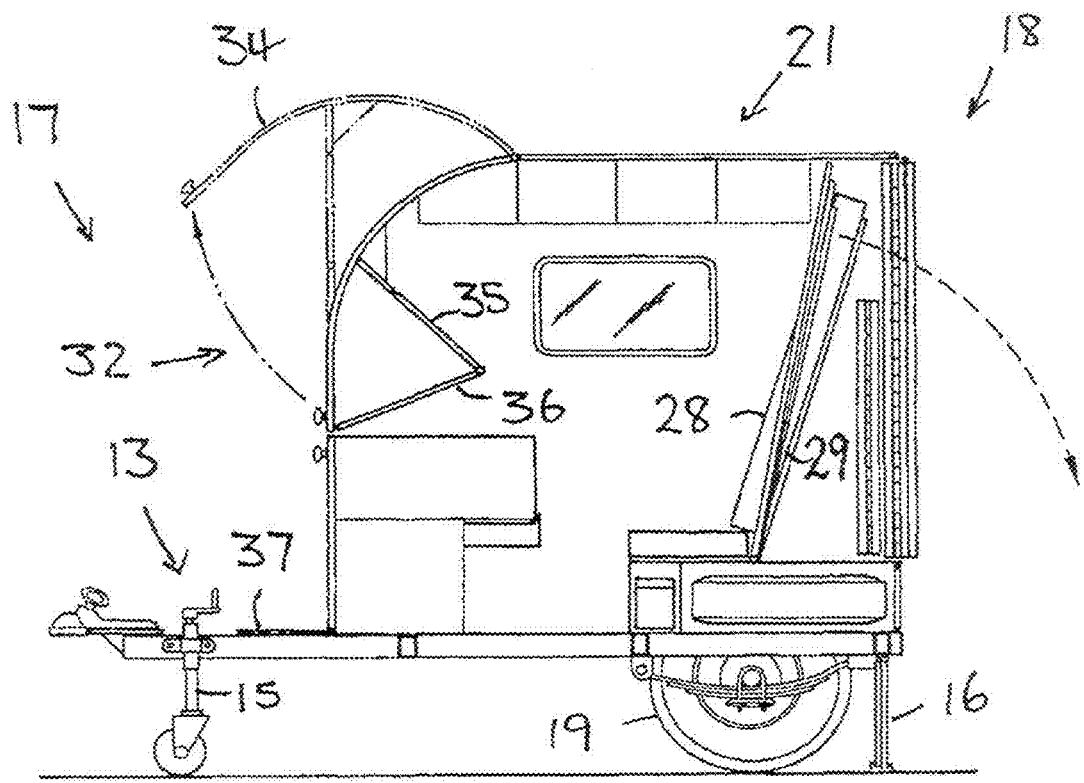
FIG. 4 is a cutaway side view of the camper trailer of FIG. 1 showing the opening procedure when the caravan is to be used for camping.
Figure 5:
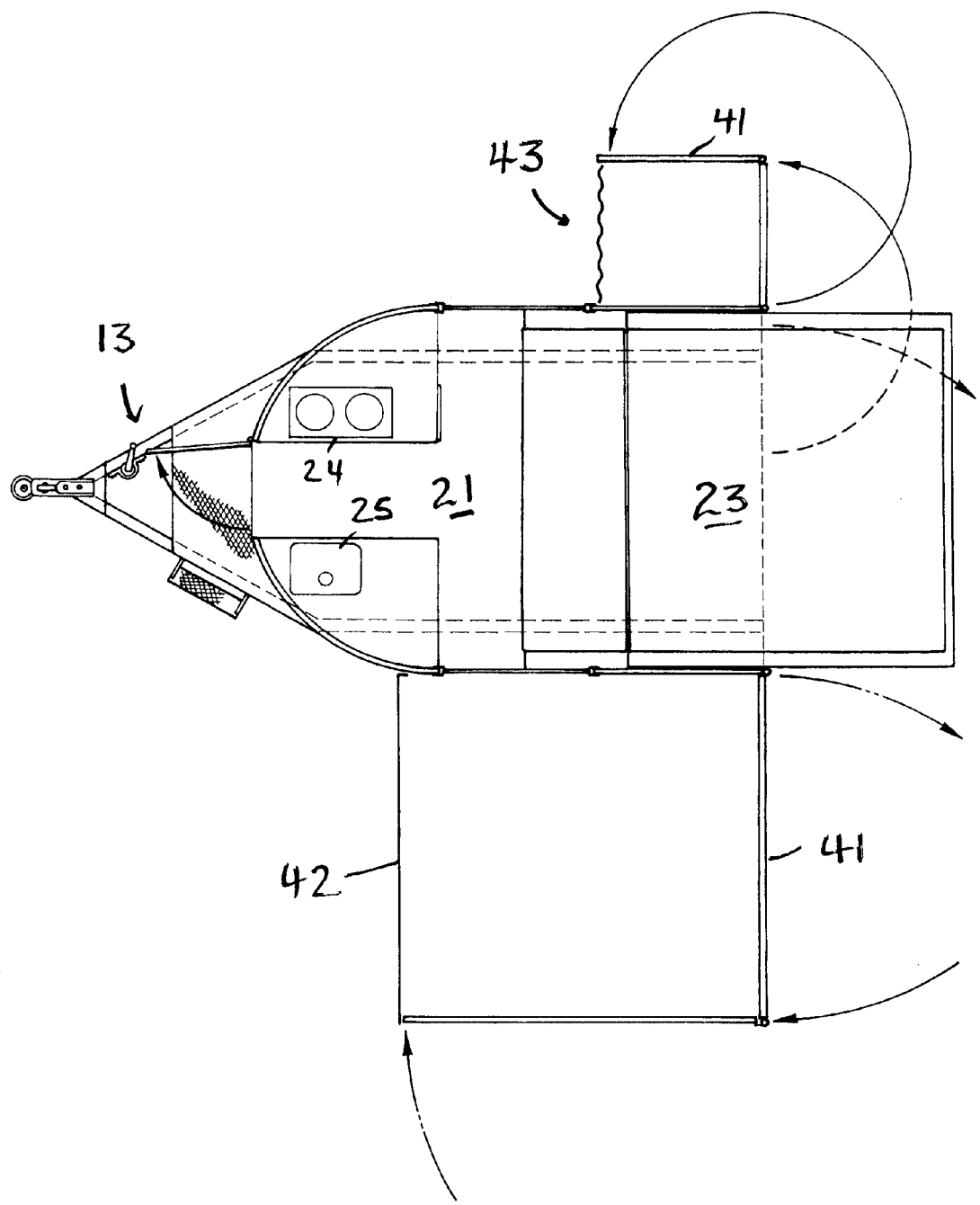
FIG. 5 is a cutaway plan view of the camper trailer of FIG. 1 shown in its open configuration.
Figure 6:
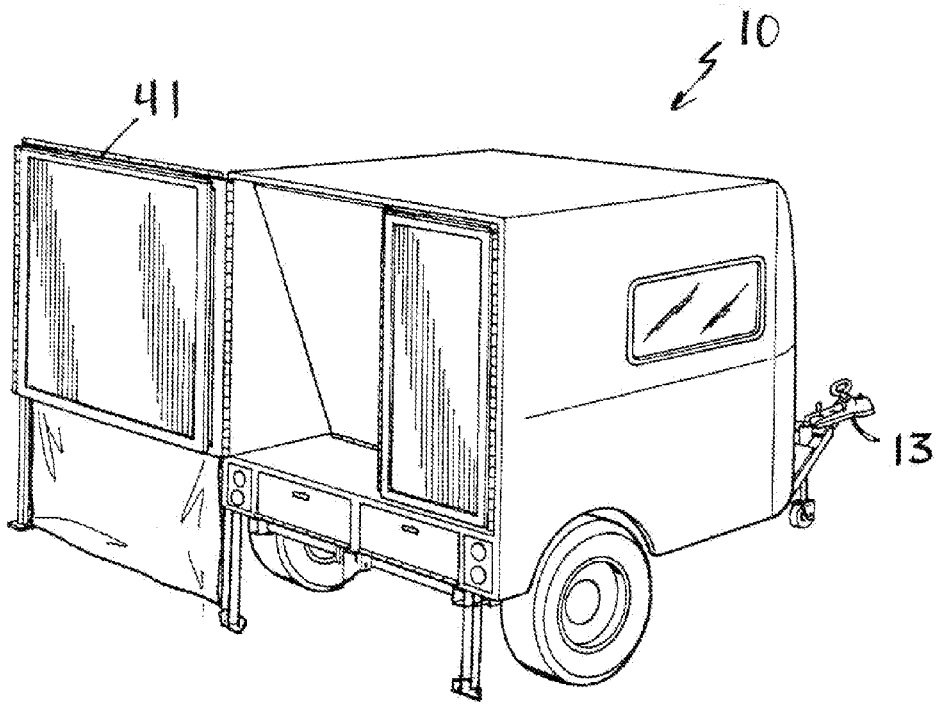
FIG. 6 is a rear perspective view of the camper trailer of FIG. 1 shown partially opened.
Figure 7:
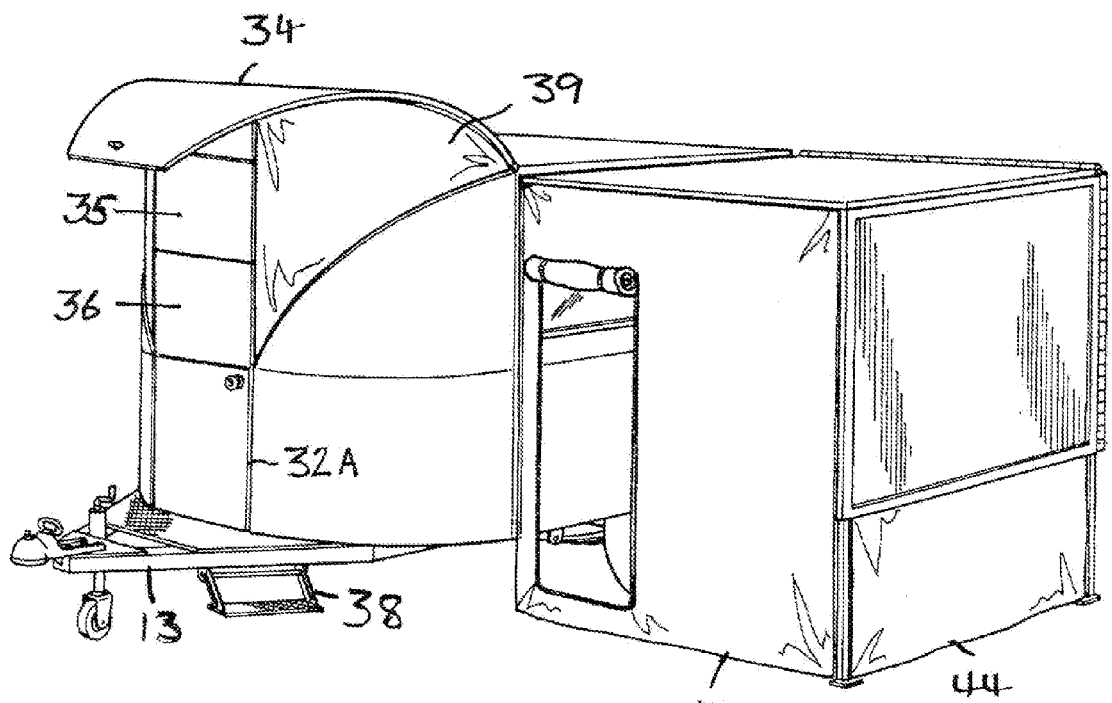
FIG. 7 is a front perspective view of the camper trailer of FIG. 1 shown in its open configuration.
Figure 8:
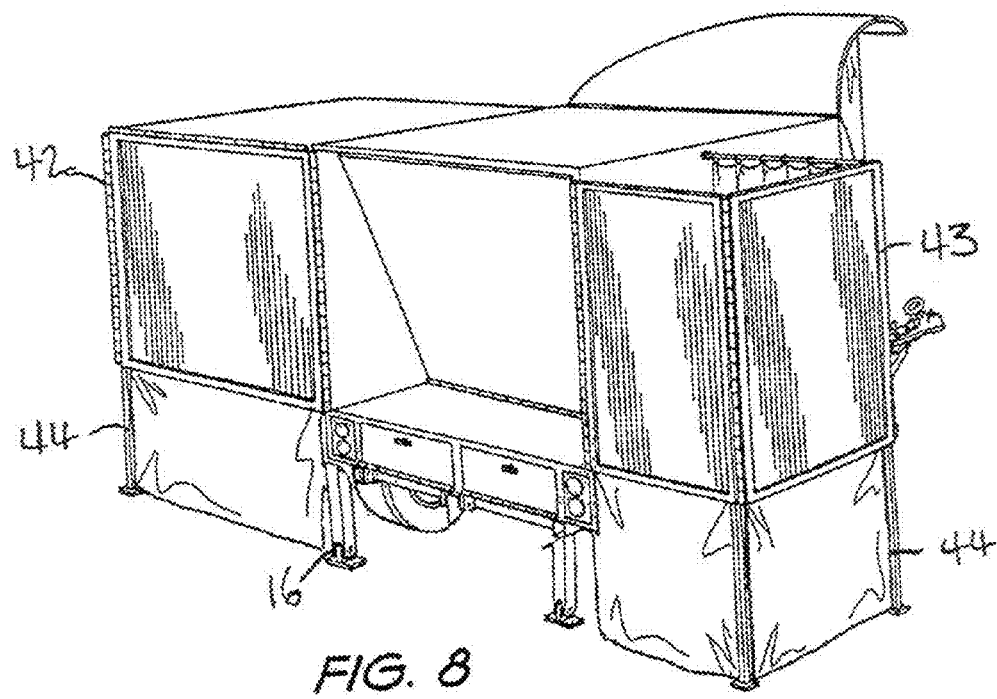
FIG. 8 is a rear perspective view of the camper trailer of FIG. 1 shown in a partial open configuration.

The kitchen chamber 22 includes a stove 24, a sink 25, a refrigerator 26 and other storage areas 27. A bench seat 28 is located within the chamber with a queen size bed 29 located there behind in a stored position as best seen in FIG. 4. The bed 29 in this position acts as a back rest for the bench seat 28. Also seen in FIGS. 3 and 4 of the drawings a spare wheel 30 and gas tank 31 are provided in storage compartments within the camper trailer 10.

The kitchen chamber 22 is accessed by an opening 32 at the front 17 of the camper trailer 10 whilst the bedroom chamber 23 is extended by opening a back wall panel 33 and lowering the bed 29 in a horizontal position. It is noted that the bed extends outside the periphery of the housing 21 when so lowered.

The front opening 32 of the camper trailer 10 includes a hinged access hatch 34 and half door 32A which form part of the front wall of the housing 21. The hatch 34 is opened upwardly and with the aid of hinged braces is held in an open arrangement while the half door 32A in conjunction with hinged panels 35 and 36 form a full height door, as illustrated in FIG. 4, which opens by pivoting on hinges in the conventional manner. The front opening 32 allows access into the kitchen chamber 22 (FIG. 3). As seen in the drawings, a platform 37 is arranged outside the hatch 34 and door 35 with a step 38 providing ease of entrance thereto. As seen when the hatch 34 is open, canvas coverings 39 or the like can be used to close the opening when the hatch 34 is in its open configuration.

As seen in FIGS. 5-9, the back wall panel 33 of the housing 21 is opened whereby hinged panels 41 which are located within the housing 21 when it is in its closed configuration are adapted to be folded outside the housing 21 to form two annex sections 42 and 43. The panels 41 form the walls and the roof of the main annex section 42 as well as a smaller toilet/shower annex section 43. The annex sections 42 and 43 are accessed from outside the camper trailer 10 as seen in the drawings.

As seen in the drawings, the panels 41 are folded from the housing 21 and there is a gap between the height of the chassis 12 and the ground. A waterproof apron 44 which is fixed to the housing 21 drops down and extends to the ground to provide an enclosure to the annex sections 42 and 43. Naturally, panels of more solid materials can be used as the apron 44 or they can be other panels folded from the panels 41.

Figure 9:
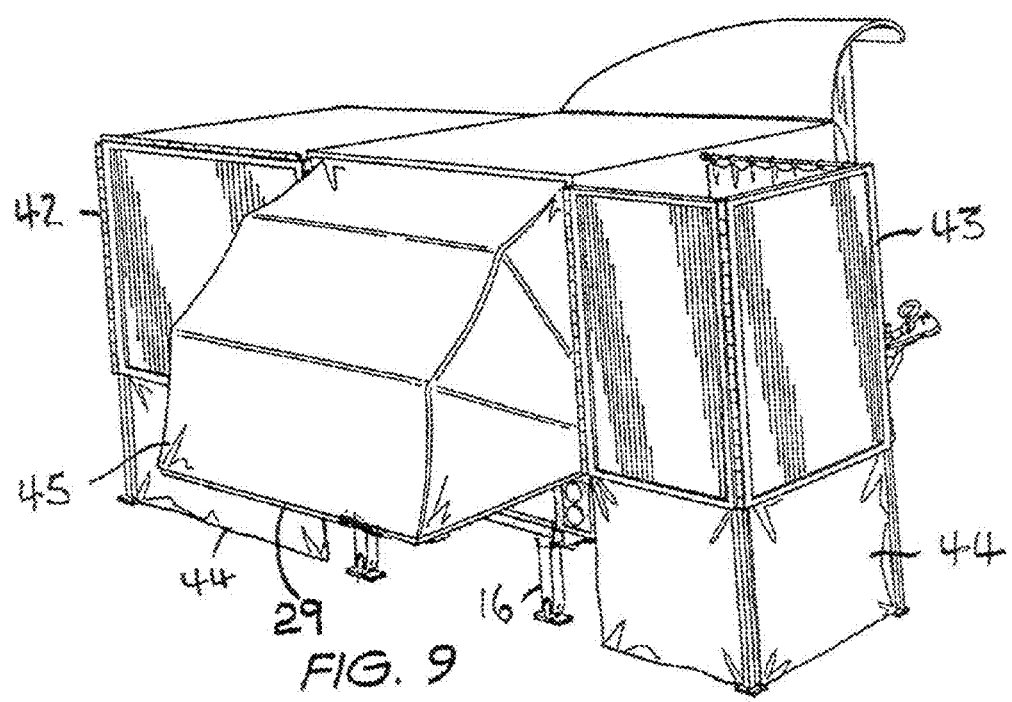
FIG. 9 is a rear perspective view of the camper trailer of FIG. 1 shown in its open configuration.

As seen in FIG. 9, the bed 29 is folded down into a horizontal position for its use. The bed 29 is cantilevered with a concertinaed canopy 45 to provide shelter therefore. When the bed 29 is not required for use, it can be easily folded back into the non-use position as seen in the drawings.

It is seen that the camper trailer 10 as described above is a compact unit and does not require that much effort to set up. The compact nature of the camper trailer 10 and the feature of the rear located wheels 19 ensure that the camper trailer 10 is suitable for both on road and off road use whereby the angle of departure from dips is much greater than many other trailers and campers.

The foregoing describes only one embodiment of the present invention and modifications, obvious to those skilled in the arts can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A camper trailer or caravan comprising a chassis adapted to be attached to, and towed behind a motor vehicle, a housing mounted on the chassis and defining a main chamber including a peripheral wall, wherein said chassis is and about the same width as the towing vehicle with the wheels located adjacent the rear end of said chassis, and said housing being adapted to be opened such that panels are vertically hingedly mounted to said housing and folded inside the housing when in the closed configuration and form annex chambers when in the open configuration when said camper trailer is being used for camping, and a bedding chamber associated with the main chamber extends outside the peripheral walls of said camper trailer, and a kitchen chamber and the bedding chamber are within the housing of the camper trailer wherein the kitchen chamber is located at front of said housing and the bedding chamber is located at rear of said housing and said kitchen chamber is accessed through an opening at the front of said trailer.

2. The camper trailer or caravan as claimed in claim 1 wherein said kitchen chamber includes kitchen appliances located adjacent said opening.

3. The camper trailer or caravan as claimed in claim 1, wherein said annex chambers are formed by said folded panels plus additional panels or waterproof aprons which each extend to the ground.

4. The camper trailer or caravan as claimed in any claim 1, wherein said annex chambers are accessed from outside the camper trailer interior.

5. The camper trailer or caravan as claimed in claim 1 wherein said housing further comprises a foldable bed adapted to form a backrest of a bench seat when not being used as a bed and wherein the bench seat spans the width of said housing.

6. The camper trailer or caravan as claimed in claim 5, wherein said bed is lowered into a horizontal position when being used as a bed, wherein said bed partially extends outside said housing when horizontal, and wherein a canopy is provided as shelter, over said bed when horizontal.

7. The camper trailer or caravan as claimed in claim 1, wherein said opening includes an upwardly opening hatch which is kept open by hinged braces.

8. The camper trailer or caravan as claimed in claim 7, wherein said opening includes an outwardly opening door below said hatch.

9. The camper trailer or caravan as claimed in claim 8, wherein said chassis has a platform located adjacent said front opening, whereby the person accessing said housing steps on said platform prior to entering said housing.

10. A camper trailer or caravan comprising a chassis adapted to be attached to, and towed behind a motor vehicle, a housing mounted on the chassis and defining a main chamber including a peripheral wall wherein the housing has a length less than twice the width of the housing and wherein the housing is about the same width as the towing vehicle, the housing being adapted to be opened such that vertically hingedly mounted panels inside the housing when in the closed configuration form annex chambers when in the open configuration when the trailer is being used for camping, and a bedding chamber associated with the main chamber which extends outside the peripheral walls of the housing when required, and a kitchen chamber wherein the bedding chamber and kitchen chamber are located within the housing of the camper trailer such that the kitchen chamber is located at a front of the housing and the bedding chamber is located at a rear of the housing and the kitchen chamber is accessed through an opening at the front of the housing, and a platform disposed on the chassis adjacent an attachment point and at the front of the housing.

11. The camper trailer or caravan as claimed in claim 10 wherein the vertically hingedly mounted panels include at least one horizontally hingedly mounted panel mounted thereto.

* * * * *